March 8, 1927.  L. GUERRINI  1,620,460
TRACTION DEVICE FOR VEHICLE WHEELS
Original Filed Jan. 12, 1921   2 Sheets-Sheet 1

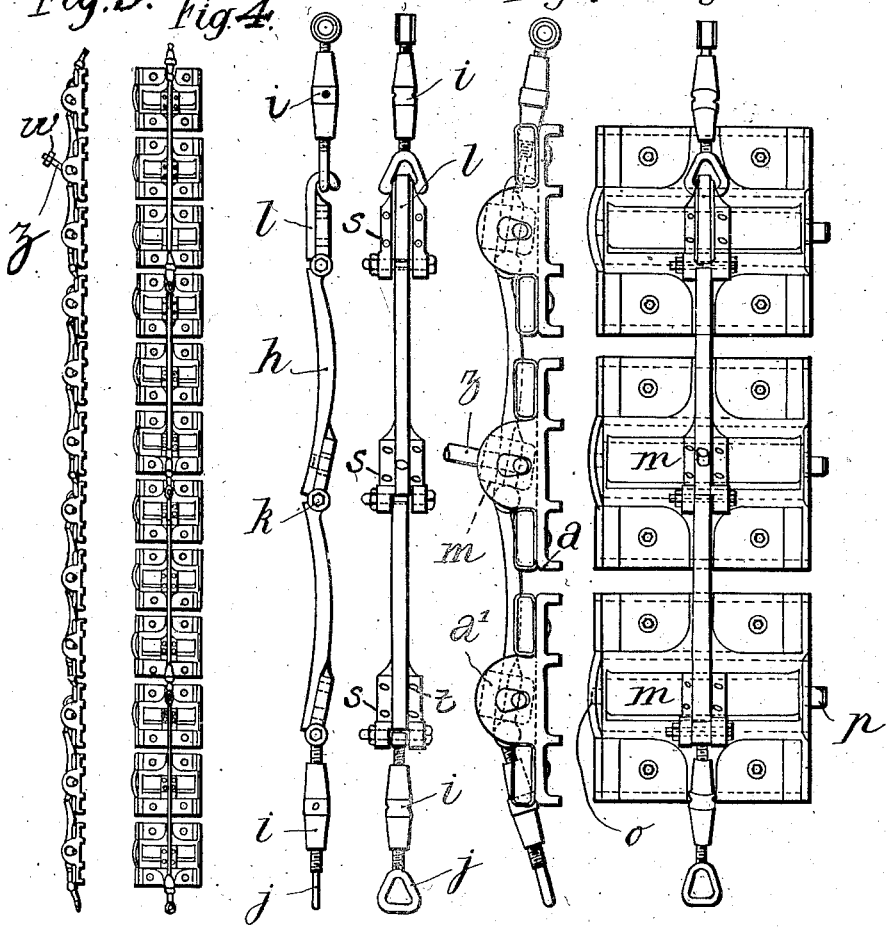

Patented Mar. 8, 1927.

1,620,460

UNITED STATES PATENT OFFICE.

LUIGI GUERRINI, OF MILAN, ITALY, ASSIGNOR TO SOCIÉTÉ ANONYME DES DISPOSITIFS D'ADHÉRENCE GUERRINI, OF PARIS, FRANCE, A FRENCH SOCIETY.

TRACTION DEVICE FOR VEHICLE WHEELS.

Original application filed January 12, 1921, Serial No. 436,752, and in Italy April 16, 1918. Divided and this application filed April 17, 1922, Serial No. 554,175. Renewed March 29, 1926.

(GRANTED UNDER THE PROVISIONS OF THE ACT OF MARCH 3, 1921, 41 STAT. L., 1313.)

This invention relates to wheels for vehicles and is a division of my application No. 436,752, for vehicle wheels, filed January 12, 1921.

The main object of the invention is to provide a traction belt for vehicles wheels adapted to carry the adhesion shoes which are disclosed in my Italian Patent No. 165,775 of Apr. 16, 1918.

A further object of the invention is to so construct the belt that it may, within certain limits be applied to a wheel of any diameter having solid or pneumatic, single or double tires and which, after being so applied, may have its length reduced so as to cause it to closely engage the periphery of such wheel.

With the above and other objects in view, my invention consists in the improved traction belt illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:

Figures 3 and 4 are, respectively, a side and a plan view of the traction belt removed from the wheel and spread out in a longitudinal position.

Figures 5 and 6 are respectively, a side and a plan view of some of the elements of the belt, said elements being connected by means of a turn-buckle to the adjacent similar elements.

Figures 7 and 8 are, respectively, a side and a plan view of the said parts having traction shoes and tire blocks attached thereto.

Figure 1:
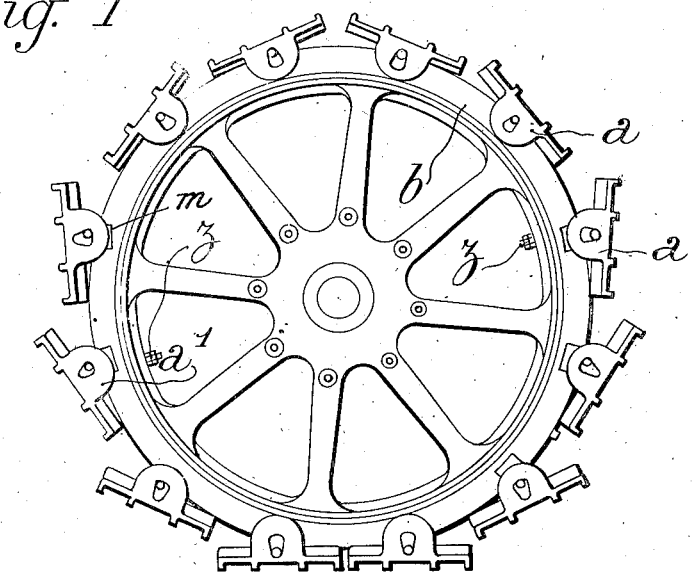
Figure 1 is a side elevation of a wheel equipped with the adhesion belt embodying my invention.
Figure 2:
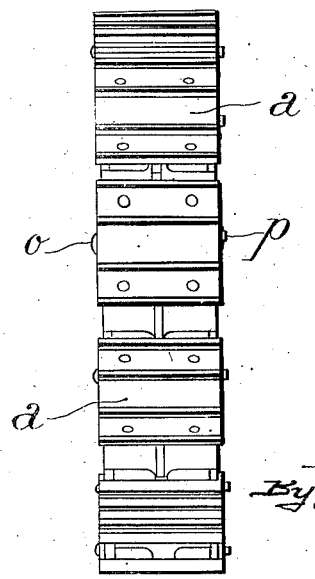
Figure 2 is an end elevation of the wheel shown in Figure 1.

Referring in detail to the several figures, the reference character $b$ represents the tire of a vehicle wheel, around the periphery of which the belt is tightened, upon which belt are loosely mounted the traction shoes $a$ of suitable material and shape, each of said shoes having cross-ribs on its ground-engaging face and a pair of lugs $a^1$ extending from its opposite face. These lugs $a^1$ are each provided with a substantially triangular slot, of which triangular slot the sides are united by arcs of circles, as described and claimed in my aforementioned Italian patent. These slots make it possible to support the shoes from the belt in such a manner that two or more of said shoes can be in contact with the ground at all times, as shown in Figure 1, so that the load of the wheel may be transferred from the leading shoe to the following shoe before the leading shoe begins to be withdrawn from contact with the ground by rotation of the wheel.

The belt upon which the shoes $a$ are suspended comprises a plurality of parts such as shown in Figures 5 and 6, each of these parts comprising rigid links $h$ hingedly joined by the hinge pins $k$. The free end of one of these links $h$ is hingedly connected to a hook $l$. The free end of the other link $h$ is hingedly connected to one of the threaded members of a turn-buckle $i$, of which the other threaded member carries the eye $j$. The hook $l$ of one link $h$ of each of said belt parts engages with the eye $j$ of the turn-buckle associated with a link of the adjacent belt part. A sufficient number of belt parts is provided to extend around the periphery of the wheel.

The turn buckles make it possible to vary the length of the belt according to the diameter of the wheel to which it must be applied and to secure it thereon.

Each of the hooks $l$ has a widened bifurcated portion $s$ to receive an end of one of the end links $h$ and the opposite end of said link has a similar widened bifurcated portion to receive one end of the adjacent link $h$. The opposite end of the latter link has a similar widened bifurcated portion to receive an end of one of the threaded members of the turn buckle $i$. The hinge pins $k$ extend through the bifurcations of the widened portions $s$ and the parts associated therewith to form the hinge joints between one end link and the hook $l$; between the opposite end link and a threaded portion of the turn buckle $i$, and between the intermediate and end links.

Upon each of the widened portions $s$ is secured a block $m$ which extends transversely of the belt, and each of these blocks at its opposite ends is provided with projecting pins $o$ and $p$ which pass through the triangular slots of the lugs $a^1$ of the traction shoes $a$ and afford means from which said shoes are suspended. The blocks $m$ are shaped to suit the periphery of the tire or tires of the wheel. If the tire is of the single type the blocks will each have a depression fitting the periphery of said tire. Should the tire be of the double type, each of the blocks will be formed with a pair of corresponding adjacent depressions and with a web shaped to extend into the groove between the two tires when the belt is tightened.

The construction of the belt whereby it may be readily separated into a plurality of parts makes it easy to mount said belt upon the wheel and to remove it from the wheel. The tightening of the belt upon the tire will prevent the relative displacing of the belt with respect to the periphery of the tires, but in special cases it may be desirable to provide bolts $z$ which are suitably fixed to one or more blocks $m$ and which pass through radial apertures in the wheel rim to secure said bolts in place by means of the nuts $w$ shown in Figure 3.

It will be understood that various changes may be made in the form and relation of parts to suit different environments, and that the invention is not intended to be limited to the precise details of construction and arrangement shown.

Having described my invention what I claim as new and desire to secure by Letters Patent is:—

1. A traction device adapted to be used with vehicle wheels, comprising a belt made up of a plurality of hingedly connected links, members extending transversely of the links having pivot pins extending beyond their sides, traction shoes, and ears extending from said shoes and having mixtilinear slots to receive said pivot pins.

2. An easily removable tractive device adapted to be applied and tightened upon vehicle wheels of different sizes, comprising a belt made up of a plurality of parts, each of said parts comprising a series of hingedly connected members, and connecting parts of variable lengths carried by the free end members of each of said series of members for connecting the parts of said belt together and serving to vary the length of the belt and also to stretch said belt upon the wheel, a series of traction members mounted, respectively, on said hingedly-connected members, one of said series of members having mixtilinear holes and the other series of members carrying pins cooperating with said holes for loosely attaching the traction members to the belt and for cogging the wheel with the belt.

3. An easily removable tractive belt adapted to be applied and tightened upon vehicle wheels of different diameters comprising a plurality of hingedly connected links, blocks and turn-buckles, ground engaging traction shoes having upstanding ears on their rear surfaces, said ears embracing the sides of said blocks and being provided with mixtilinear triangular holes, and pins projecting from the sides of said blocks and riding in said holes, said pins cooperating with said holes for pivotally and loosely connecting said shoes to the blocks and for permitting the cogging of the wheel with said shoes as said shoes are successively laid upon the ground.

In testimony whereof I have hereunto set my hand.

LUIGI GUERRINI.